United States Patent
Chen (10) Patent No.: US 9,900,544 B2
(45) Date of Patent: Feb. 20, 2018

(54) VIDEO SIGNAL PROCESSING SYSTEM, VIDEO SIGNAL PROCESSING CHIP AND VIDEO SIGNAL PROCESSING METHOD

(71) Applicant: MStar Semiconductor, Inc., Hsinchu Hsien (TW)

(72) Inventor: Kai-Yu Chen, Taichung (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 15/249,740

(22) Filed: Aug. 29, 2016

(65) Prior Publication Data

US 2017/0223305 A1   Aug. 3, 2017

(30) Foreign Application Priority Data

Feb. 2, 2016 (TW) .............................. 105103337 A (51) Int. Cl.
*H04N 5/05* (2006.01)
*H04N 5/46* (2006.01)
*G09G 5/12* (2006.01)

(52) U.S. Cl.
CPC ................. *H04N 5/46* (2013.01); *G09G 5/12* (2013.01)

(58) Field of Classification Search
CPC ............................. H04N 21/2365; H04N 5/05
USPC ......... 348/500, 516, 517, 521–522, 552–553
See application file for complete search history.

(56) References Cited

U.S. PATENT DOCUMENTS

| | | | | |
|---|---|---|---|---|
| 5,343,301 A * | 8/1994 | Wesolowski | ............. | H04N 7/24 348/500 |
| 5,553,252 A * | 9/1996 | Takayanagi | ............. | G09G 5/39 710/11 |
| 6,219,740 B1 * | 4/2001 | Mabuchi | ............. | G06F 9/30105 710/305 |
| 6,587,154 B1 * | 7/2003 | Anderson | ............. | H04N 5/44513 348/553 |
| 7,649,569 B2 * | 1/2010 | Chang | ............. | H04N 5/126 348/497 |
| 2011/0173654 A1 * | 7/2011 | Todo | ............. | H04N 21/2368 725/32 |
| 2013/0179666 A1 * | 7/2013 | Yamashita | ............. | G06F 9/3834 712/228 |

* cited by examiner

*Primary Examiner* — Paulos M Natnael
(74) *Attorney, Agent, or Firm* — Edell, Shapiro & Finnan, LLC (57) ABSTRACT

A video signal processing system includes a first video signal processing chip and a second video signal processing chip. The first video signal processing chip determines whether both of a first video signal and a second video signal are in a stable state. After the first video signal processing chip determines that both of the first and second video signals are in the stable state, the first video signal processing chip sends a synchronization signal to the first video processing chip and the second video processing chip. After receiving the synchronization signal, the first video signal processing chip and the second video signal processing chip respectively output a first processed video signal and a second processed video signal to a display device.

12 Claims, 5 Drawing Sheets

VIDEO SIGNAL PROCESSING SYSTEM, VIDEO SIGNAL PROCESSING CHIP AND VIDEO SIGNAL PROCESSING METHOD

This application claims the benefit of Taiwan application Serial No. 105103337, filed Feb. 2, 2016, the subject matter of which is incorporated herein by reference.

BACKGROUND OF THE INVENTION

Field of the Invention

The invention relates in general to a signal processing system, a signal processing chip and a signal processing method, and more particularly to a video signal processing system, a video signal processing chip and a video signal processing method.

Description of the Related Art

As display panel technologies continue to progress, the size of display devices is also ever-increasing. A large-sized display device is capable of more precise displays to present better image quality.

Figure 1:
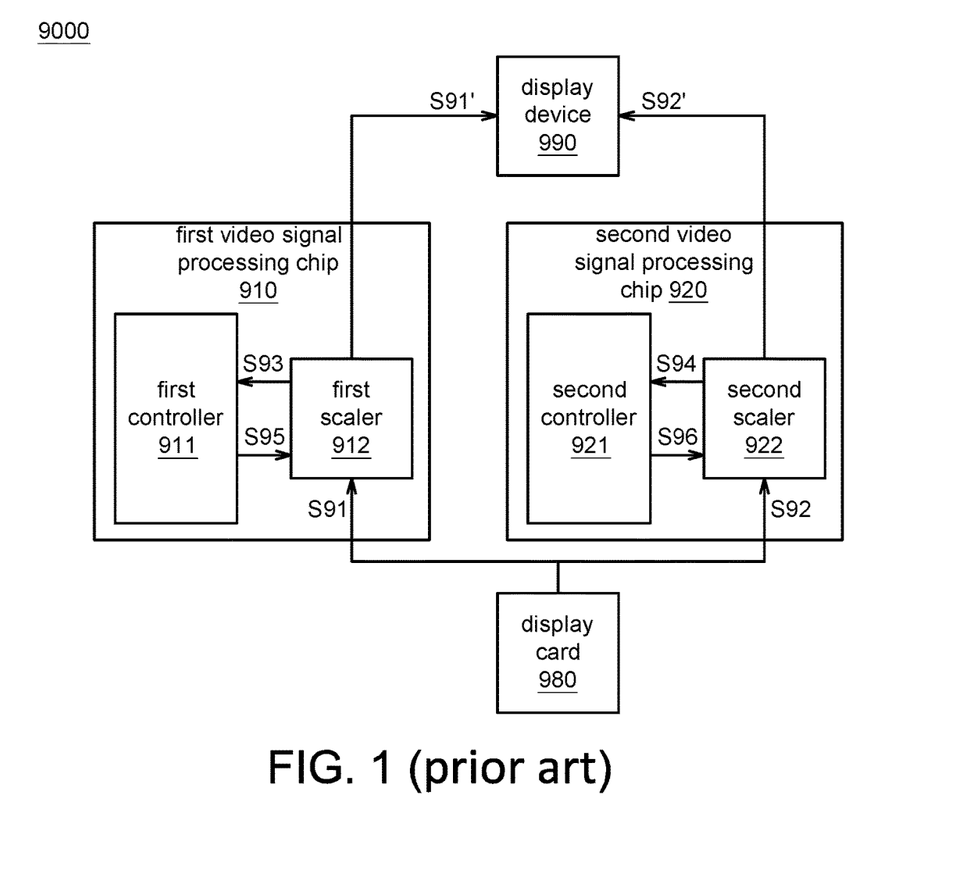
FIG. 1 is a schematic diagram of a conventional signal processing system.

For a display device having high resolution, dual video signal processing chips are needed for processing video signal. FIG. 1 shows a schematic diagram of a conventional video signal processing system 9000. The video signal processing system 9000 includes a first video signal processing chip 910, a second video signal processing chip 920, a display card 980, and a display device 990. The first video signal processing chip 910 includes a first controller 911 and a first scaler 912. The display card 980 outputs a first video signal S91 and a second video signal S92. For example, the first video signal S91 is a signal of a left-half image, and the second video signal S92 is a signal of a right-half image.

After the first video signal S91 is inputted into the first scaler 912, the first scaler 912 adjusts the first video signal S91 to a first processed video signal S91' according information of the display device 990 such as image ratio and resolution.

The first controller 911 receives an information inspection signal S93 from the first scaler 912 to determine whether the first video signal S91 is stable. After the first controller 911 determines that the first video signal S91 is in a stable state, the first controller 911 outputs a notification signal S95 to the first scaler 912 to notify the first scaler 912 to output the first processed video signal S91' to the display device 990.

Similarly, after the second video signal S92 is inputted into the second scaler 922, the second scaler 922 adjusts the second video signal S92 to a second processed video signal S92' according to the information of the display device 990 such as image ratio and resolution.

The second controller 921 receives an information inspection signal S94 from the second scaler 922 to determine whether the second video signal S92 is stable. After the second controller 921 determines that the second video signal S92 is in a stable state, the second controller 921 outputs a notification signal S96 to the second scaler 922 to notify the second scaler 922 to output the second processed signal S92' to the display device 990.

However, time points at which the first controller 911 determines that the first video signal S91 is in a stable state and the second controller 921 determines that the second video signal S92 is in a stable state may not be the same time point, in a way that the image displayed by the display device 990 may appear asynchronously. Thus, there is a need for overcoming such bottleneck for video signal synchronization in the field of dual video signal processing chips.

SUMMARY OF THE INVENTION

The invention is directed to a video signal processing system, a video signal processing chip and a video signal processing method. Using a synchronization signal, a first processed video signal and a second processed video signal are synchronously outputted to a display device, such that an image displayed by the display device may appear synchronously.

According to an aspect of the present invention, a video signal processing system is provided. The video signal processing system includes a first video signal processing chip and a second video signal processing chip. The first video signal processing chip receives a first video signal from a display card. The second video signal processing chip receives a second video signal from the display card. The first video signal processing chip determines whether both of the first video signal and the second video signal are in a stable state. After the first video signal processing chip determines that both of the first video signal and the second video signal are in the stable state, the first video signal processing chip sends a synchronization signal to the first video signal processing chip and the second video signal processing chip. After receiving the synchronization signal, the first video signal processing chip outputs a first processed video signal to a display device according to the first video signal. After receiving the synchronization signal, the second video signal processing chip outputs a second processed video signal to the display device according to the second video signal.

According to another aspect of the present invention, a video signal processing chip is provided. The video signal processing chip includes a scaler and a controller. The scaler receives a video signal. The controller determines whether both of the video signal and another video signal received by another video signal processing chip are in a stable state. After the controller determines that both of the video signal and the another video signal are in the stable state, the controller sends a synchronization signal to the video processing chip and the another video processing chip. After the synchronization signal is received, the controller controls the scaler to output a scaled signal to a display device according to the video signal.

According to another aspect of the present invention, a video signal processing method is provided. The video signal processing method is for controlling a video signal processing system, which is connected between a display device and a display card. The video signal processing system includes a video signal processing chip and another video signal processing chip. The video signal processing method includes following steps. The video signal processing chip receives a video signal from the display card. The video signal processing chip determines whether both of the video signal and another video signal received from the another video signal processing chip are in a stable state. After the video signal processing chip determines that both of the video signal and the another video signal are in the stable state, the video signal processing chip sends a synchronization signal to the video signal processing chip and the another video signal processing chip. After receiving the synchronization signal, the video signal processing chip outputs a processed signal to a display device according to the video signal.

The above and other aspects of the invention will become better understood with regard to the following detailed description of the preferred but non-limiting examples. The following description is made with reference to the accompanying drawings.

DETAILED DESCRIPTION OF THE INVENTION

Figure 2:
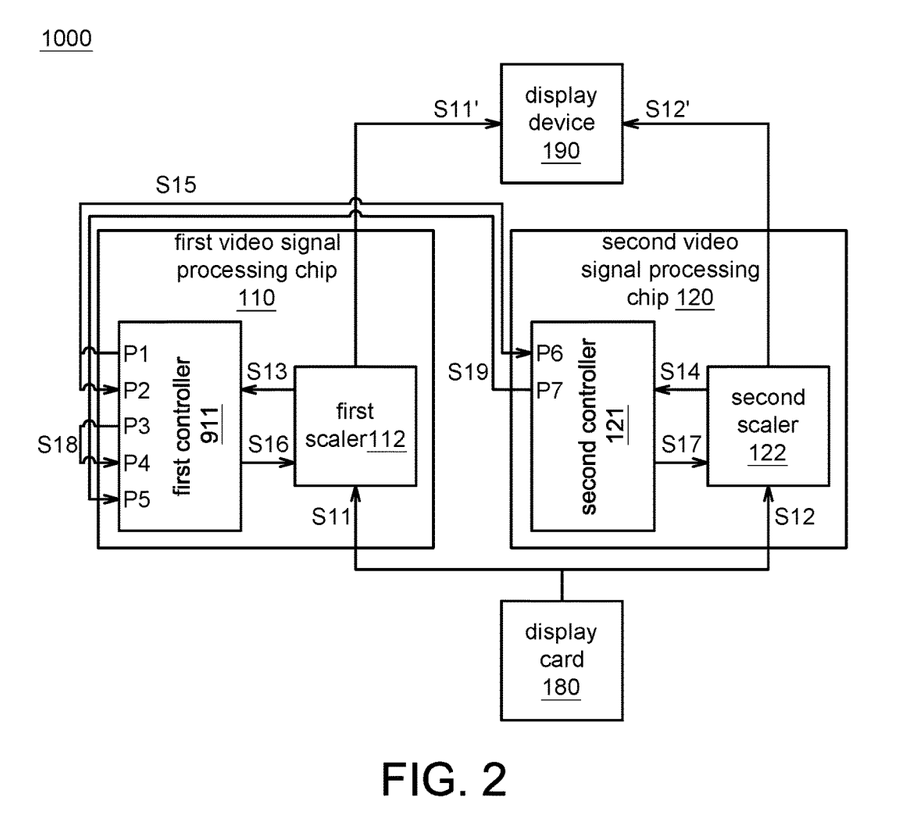
FIG. 2 is a schematic diagram of a video signal processing system according to an example of the present invention.

FIG. 2 shows a schematic diagram of a video signal processing system 1000 according to an example of the present invention. The video signal processing system 1000 includes, for example, a first video signal processing chip 110, a second video signal processing chip 120, a display card 180 and a display device 190. The first video signal processing chip 110 and the second video signal processing chip 120 may be two independently packaged chips, or may be packaged in a same packaged module. In this example, the quantity of the video signal processing chip is two. In another example, the quantity of the video signal processing chip may be greater than 2. The display device 190 is, for example, a liquid crystal display (LCD), an organic light-emitting diode (OLED) display panel, a plasma display device, or a projector.

The first video signal processing chip 110, for example, includes a first controller 110 and a first scaler 112. The second video signal processing chip 120, for example, includes a second controller 121 and a second scaler 122. The first controller 111 and the second controller 121 are for performing various analysis and control procedures. The first scaler 112 and the second scaler 122 are for performing scaling and resolution adjustment procedures.

After the first scaler 112 of the first video signal processing chip 110 receives a first video signal S11 from the display card 180, the first scaler 112 adjusts the first video signal S11 to a first processed video signal S11' according to information of the display device 190 such as image ratio and resolution. Similarly, after the second scaler 122 of the second video signal processing chip 120 receives a second video signal S12 from the display card 180, the second scaler 122 adjusts the second video signal S12 to a second processed video signal S12' according to the information of the display device 190 such as image ratio and resolution.

For example, when the resolution of the display device 190 is higher than the resolutions of the first video signal S11 and the second video signal S12, the first scaler 112 and the second scaler 122 may perform interpolation on the first video signal S11 and the second video signal S12, respectively. Alternatively, when the resolution of the display device 190 is lower than the resolutions of the first video signal S11 and the second video signal S12, the first scaler 112 and the second scaler 122 may perform concentration on the first video signal S11 and the second video signal S12, respectively.

Alternatively, when the image ratio of the display device 190 is 16:9 and the image ratios of the first video signal S11 and the second video signal S12 are 4:3, the first scaler 112 and the second scaler 122 may perform trimming or row-interpolation on the first video signal S11 and the second video signal S12.

After receiving the first video signal S11, the first scaler 122 may obtain related information of the first video signal S11, such as a horizontal scanning value (Hperiod), a vertical scanning value (Vtotal) and synchronization polarity, and output an information inspection signal S13 to the first controller 111 to inform the first controller 111 of the related information of the first video signal S11. The first controller 111 determines whether the first video signal S11 is in a stable state according to the information inspection signal S13.

In one example, the first controller 111 determines whether the first video signal S11 is in the stable state according to the information inspection signal S13 by determining whether each of the horizontal scanning value, the vertical scanning value and the synchronization polarity of the first video signal S11 satisfies a predetermined condition and sustains for a predetermined period. For example, the predetermined condition is whether the horizontal scanning value of the first video signal S11 is in an interval of ±80, whether the vertical scanning value of the first video signal S11 is in an interval of ±4, and whether the synchronization polarity of the first video signal S11 stays unchanged. For example, the predetermined period is 100 millisecond (ms). When the three conditions above sustain for 100 ms, the first controller 111 may determine that the first video signal S11 is in a stable state.

Similarly, after receiving the second video signal S12, the second scaler 122 may obtain related information of the second video signal S12, and output an information inspection signal S14 to the second controller 121 to inform the second controller 121 of the related information of the second video signal S12. The second controller 121 determines whether the second video signal S12 is in a stable state according to the information inspection signal S14. Details of how the second controller 121 determines whether the second video signal S12 is in a stable state according to the information inspection signal S14 are similar to how the first controller 111 determines whether the first video signal S11 is in a stable state according to the information inspection signal S13, and are omitted herein.

After the first controller 111 of the first video signal processing chip 110 determines that the first video signal S11 is in a stable state, the first controller 111 outputs a first preparation signal S18 to the first video signal processing chip 110 itself. Similarly, after the second controller 121 of the second video signal processing chip 120 determines that the second video signal S12 is in a stable state, the second controller 121 outputs a second preparation signal S19 to the first video signal processing chip 110. The first controller 111 of the first video signal processing chip 110 determines whether both of the first video signal S11 and the second video signal S12 are in a stable state according to the first preparation signal S18 and the second preparation signal S19.

In one example, as shown in FIG. 2, the first preparation signal S18 is outputted via a general purpose input/output (GPIO) port P3 of the first video signal processing chip 110 to a GPIO port P4 of the first controller 111 of the first video signal processing chip 110 itself. For example, outputting the first preparation signal S18 may be pulling up a potential level of the first preparation signal S18. The second preparation signal S19 is outputted via a GPIO port P7 of the second controller 121 of the second video signal processing chip 120 to a GPIO port P5 of the first controller 111 of the first video signal processing chip 110. For example, outputting the second preparation signal S19 may be pulling up a potential level of the second preparation signal S19. In one example, the first controller 111 of the first video signal processing chip 110 determines whether the first video signal S11 and the second video signal S12 are in a stable state according to the first preparation signal S18 and the second preparation signal S19 by determining whether the second preparation signal S19 is at a high level in a predetermined time interval after determining that the first preparation signal S18 is at a high level. When the second preparation signal S19 is at a high level in a predetermined time interval after determining that the first preparation signal S18 is at a high level, the first controller 111 may determine that both of the first video signal S11 and the second video signal S12 are in a stable state.

After determining that both of the first video signal S11 and the second video signal S12 are in a stable state according to the first preparation signal S18 and the second preparation signal S19, the first controller 111 of the first video signal processing chip 110 may send a synchronization signal S15 to the first video signal processing chip 110 and the second video signal processing chip 120.

In one example, as shown in FIG. 2, the synchronization signal S15 is outputted via a GPIO port P1 of the first video signal processing chip 110 to a GPIO port P2 of the first video signal processing chip 110 and a GPIO port P6 of the second video signal processing chip 120. For example, outputting the synchronization signal S15 may be pulling up a potential level of the synchronization signal S15.

The first controller 111 of the first video signal processing chip 110 outputs a notification signal S16 to the first scaler 112 after receiving the synchronization signal S15 to control the first scaler 112 to output the first processed video signal S11' to the display device 190. Similarly, the second controller 121 of the second video signal processing chip 120 outputs a notification signal S17 to the second scaler 122 after receiving the synchronization signal S15 to control the second controller 122 to output the second processed video signal S12' to the display device 190.

As such, the first video signal processing chip 110 and the second video signal processing chip 120 synchronously output the first processed video signal S11' and the second processed video signal S12' to the display device 190 only after receiving the synchronization signal S15. Therefore, the image displayed by the display device 190 may appear synchronously.

In one example, the synchronization signal S15 is an interrupt signal. Once the interrupt signal is received, a process originally queuing to be processed is interrupted and the interrupt signal is responded with priority. Thus, in this example, using the interrupt signal as the synchronization signal S15 ensures that the first video signal processing chip 110 and the second video signal processing chip 120 synchronously output the first processed video signal S11' and the second processed video signal S12' to prevent the display device 190 from displaying an asynchronous image.

In one example, only after determining that the first video signal S11 is in a stable state, the first video signal processing chip 110 determines whether both of the first video signal S11 and the second video signal S12 are in a stable state. That is to say, before the first video signal processing chip 110 determines that the first video signal S11 is in a stable state, the first video signal processing chip 110 does not determine whether the second video signal S12 is in a stable state.

Figure 3:
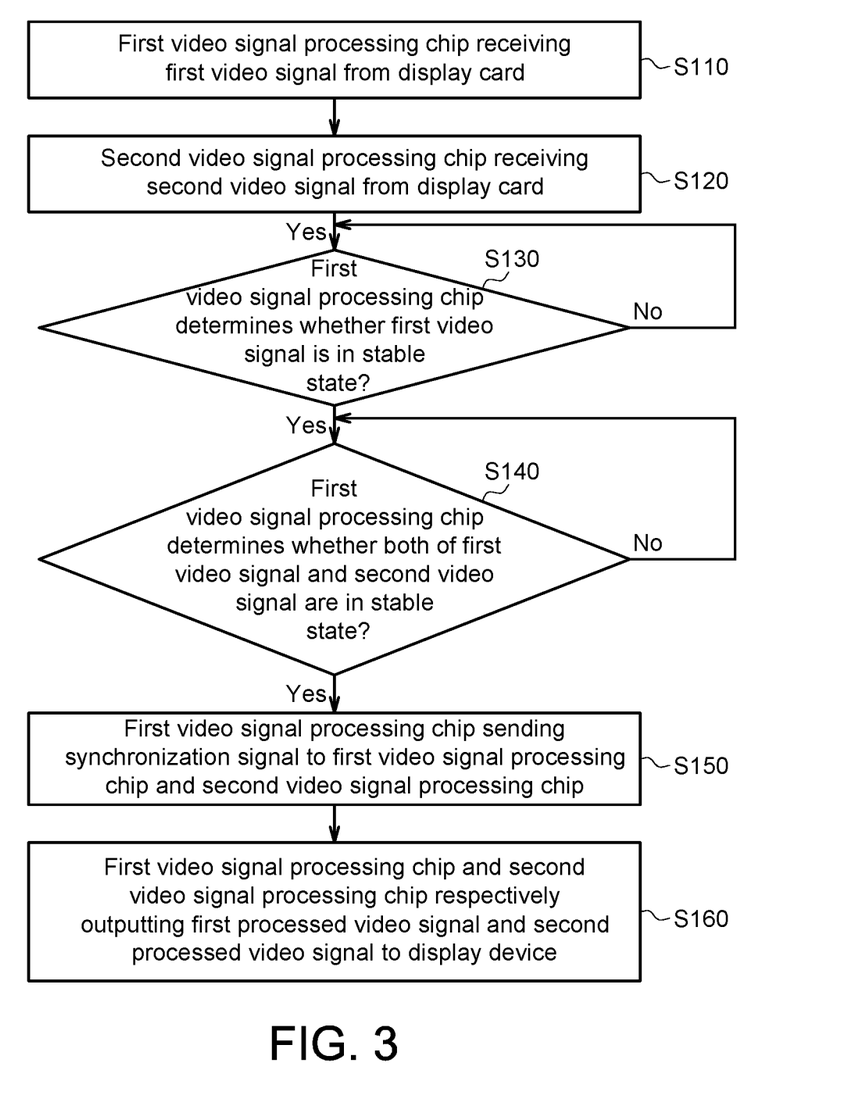
FIG. 3 is a flowchart of a video signal processing method according to an example of the present invention.

FIG. 3 shows a flowchart of a video signal processing method according to an example of the present invention. The flowchart in FIG. 3 is an example for explaining the video signal processing method according to an example of the present invention, and the video signal processing method of the present invention is not limited to the order of the steps shown in FIG. 3. The flowchart in FIG. 3 is described in detail with reference to the video signal processing system 1000 in FIG. 2.

In step S110, the first video signal processing chip 110 receives the first video signal S11 from the display card 180. In step S120, the second video signal processing chip 120 receives the second video signal S12 from the display card 180.

In one example, the orders for performing steps S110 and S120 may be swapped. Alternatively, in one example, steps S110 and S120 may be simultaneously performed.

In step S130, the first video signal processing chip 110 determines whether the first video signal S11 is in a stable state. For example, three conditions below may be determined—whether the horizontal scanning value of the first video signal S11 is an interval of ±80, whether the vertical scanning value of the first video signal S11 is in an interval of ±4, and whether the synchronization polarity of the first video signal S11 stays unchanged. When the three conditions above sustain for a predetermined period, it is determined that the first video signal S11 is in a stable state.

In step S140, after determining that the first video signal S11 is in a stable state, the first video signal processing chip 110 determines whether both of the first video signal S11 and the second video signal S12 are in a stable state. For example, after determining that the first video signal S11 is in a stable state, the first video signal processing chip 110 determines whether the second video signal S12 is in a stable state in a predetermined time interval. When it is determined that the second video signal S12 is in a stable state in the predetermined time interval, it means that both of the first video signal S11 and the second video signal S12 are in a stable state.

In step S150, after determining that both of the first video signal S11 and the second video signal S12 are in a stable state, the first video signal processing chip 110 sends the synchronization signal S15 to the first video signal processing chip 110 and the second video signal processing chip 120.

In step S160, the video signal processing chip 110 and the second video signal processing chip 120 respectively output the first processed video signal S11' and the second processed video signal S12' to the display device 190 according to the synchronization signal S15.

Thus, only after receiving the synchronization signal S15, the video signal processing chip 110 and the second video signal processing chip 120 then synchronously output the first processed video signal S11' and the second processed video signal S12' to the display device 190. Therefore, an image displayed by the display device 190 may appear synchronously.

Figure 4:
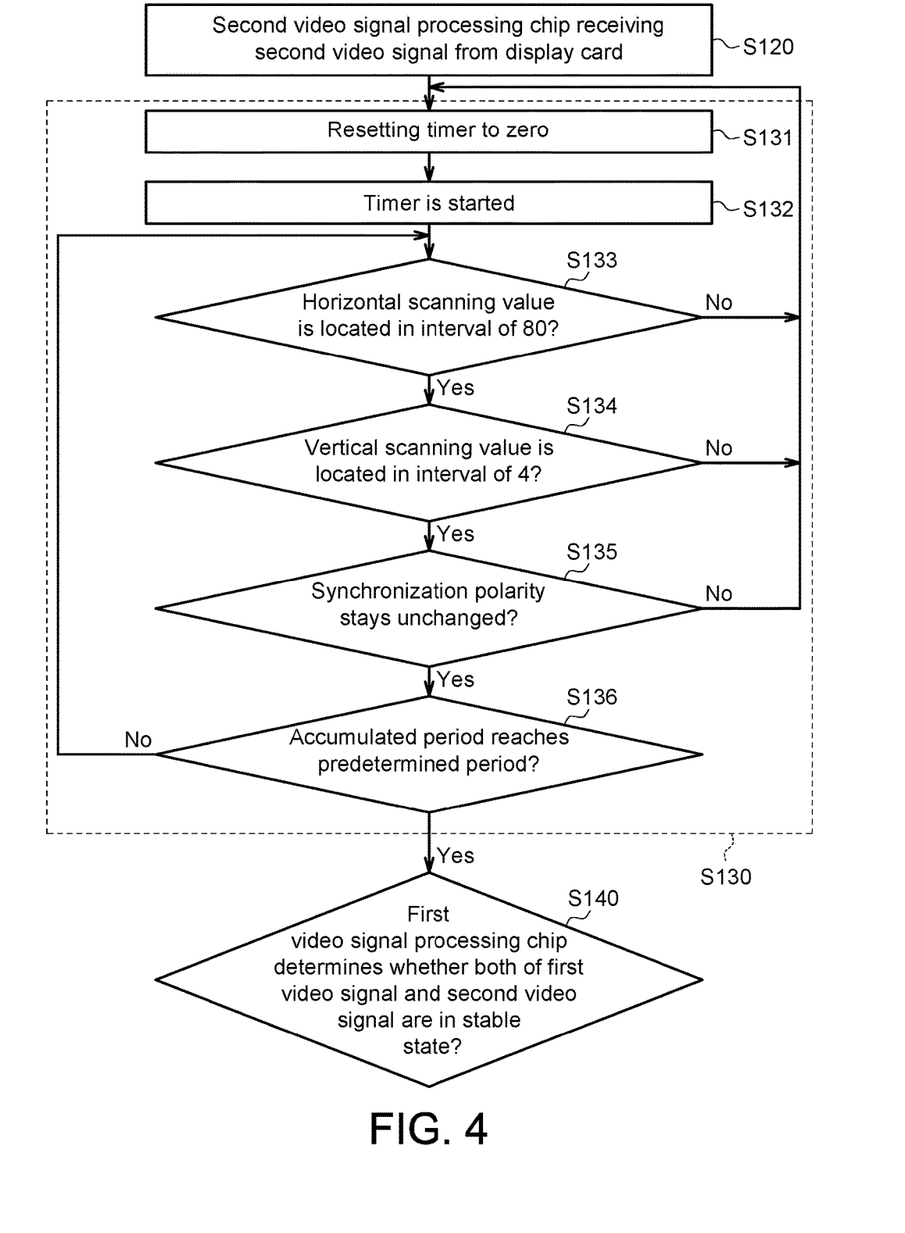
FIG. 4 is a detailed flowchart of step S130 in FIG. 3 according to an example of the present invention.

FIG. 4 shows a detailed flowchart of step S130 in FIG. 3 according to an example of the present invention. In one example, step S130 in FIG. 3 may further includes sub-steps. However, the detailed flowchart in FIG. 4 is an example for explaining step S130 in FIG. 3, and step S130 in FIG. 3 is not limited to the orders of the sub-steps shown in FIG. 4.

In step S131, a timer is reset to zero.

In step S132, the timer is activated to start timing an accumulated period.

In step S133, it is determined whether the horizontal scanning value is in an interval of ±80.

In step S134, it is determined whether the vertical scanning value is in an interval of ±4.

In step S135, it is determined whether the synchronization polarity stays unchanged.

In one example, the orders of performing steps S131, S132 and S133 may be modified. In another example, steps S131, S132 and S133 may be performed simultaneously.

When a determination result of any of the steps S131, S132 and S133 is negative, the process returns to step S131 to again reset the timer to zero, followed by performing step S132 to again activate the timer. Only when determination results of all of steps S131, S132 and S133 are affirmative, step S136 is performed.

In step S136, it is determined whether the accumulated period reaches a predetermined period. Determinations of steps S133, S134 and S135 are again performed if the accumulated period does not reach the predetermined period (e.g., 100 ms), and step S140 is performed only when the accumulated period reaches the predetermined period.

That is to say, in order to determine whether the three conditions above sustain for the predetermined period, before the accumulated period reaches the predetermined period, the determinations of steps S133, S134 and S135 are repeated. Before the accumulated period reaches the predetermined period, if any of the conditions is not satisfied, the process returns to step S131 to again reset and re-time the accumulated period. Only when all of the three conditions are satisfied through repeated determinations and the accumulated period reaches the predetermined period, it is determined that the three conditions above sustain for the predetermined period.

Figure 5:
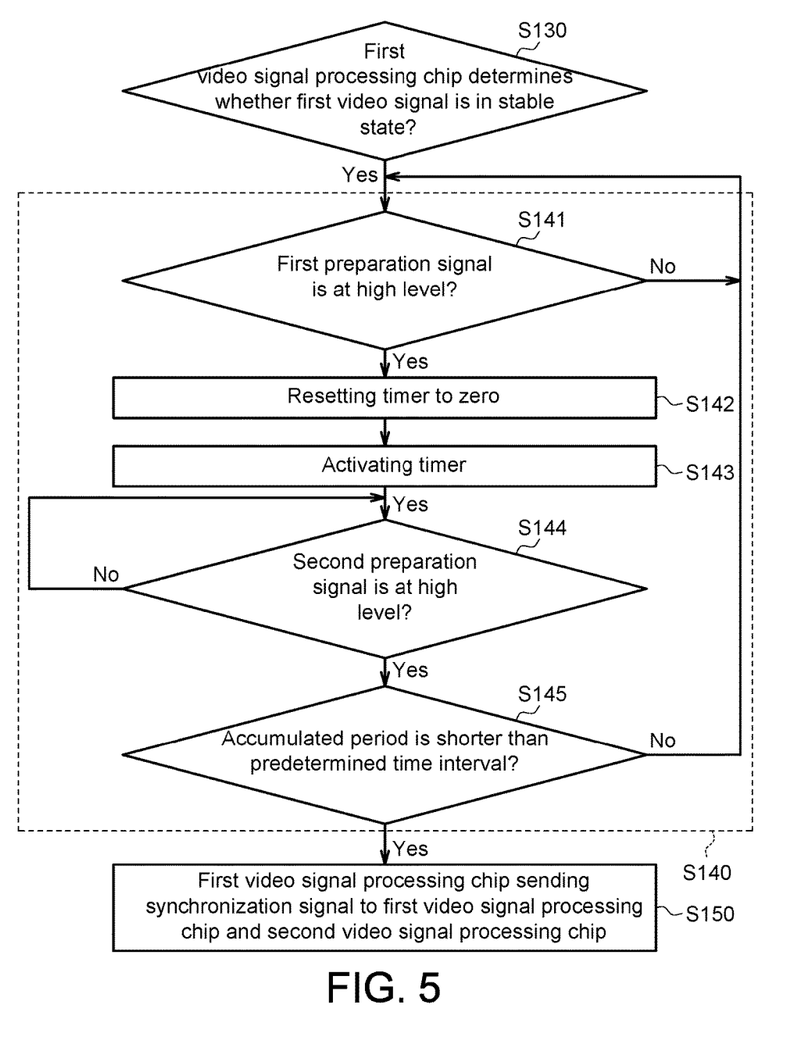
FIG. 5 is a detailed flowchart of step S140 in FIG. 3 according to an example of the present invention

FIG. 5 shows a detailed flowchart of step S140 in FIG. 3 according to an example of the present invention. In one example, step S140 in FIG. 3 may further include several sub-steps. However, the detailed flowchart in FIG. 5 is an example for explaining step S140 in FIG. 3, and step S140 in FIG. 3 is not limited to the orders of the sub-steps shown in FIG. 5.

In step S141, it is determined whether the first preparation signal S18 is at a high level. When it is determined that the first preparation signal S18 is not at a high level, the determination of step S141 is repeated, and step S142 is performed only when it is determined that the first preparation signal S18 is at a high level.

In step S142, the timer is reset to zero.

In step S143, the timer is activated to start timing the accumulated period.

In step S144, it is determined whether the second preparation signal S19 is at a high level. When it is determined that the second preparation signal S19 is not at a high level, the determination of step S144 is repeated, and step S145 is performed only when it is determined that the second preparation signal S19 is at a high level.

In step S145, it is determined whether the accumulated period is shorter than the predetermined period. When it is determined that the accumulated period is not shorter than the predetermined period, it means that an interval between the first preparation signal S18 and the second preparation signal S19 pulled to a high level is too long, and the determination of step S141 is again performed. When it is determined that the accumulated period is shorter than the predetermined period, step S150 is performed. Thus, when it is determined that the first preparation signal S18 is at a high level and it is also determined that the second preparation signal S19 is at a high level within the predetermined time interval, it is determined that both of the first video signal S11 and the second video signal S12 are in a stable state.

It is illustrated with the above examples that, only after receiving the synchronization signal S15, the first video signal processing chip 110 and the second video signal processing chip 120 synchronously output the first processed video signal S11' and the second processed video signal S12' to the display device 190, respectively. Thus, the image displayed by the display device 190 may appear synchronously.

While the invention has been described by way of example and in terms of the preferred examples, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A video signal processing system, comprising:
a first video signal processing chip, receiving a first video signal from a display card; and
a second video signal processing chip, receiving a second video signal from the display card;
wherein, the first video signal processing chip determines whether both of the first video signal and the second video signal are in a stable state;
after the first video signal processing chip determines that both of the first video signal and the second video signal are in the stable state, the first video signal processing chip sends a synchronization signal to the first video signal processing chip and the second video signal processing chip;
after receiving the synchronization signal, the first video signal processing chip outputs a first processed video signal to a display device according to the first video signal; and
after receiving the synchronization signal, the second video signal processing chip outputs a second processed video signal to the display device according to the second video signal,
wherein:
the first video signal processing chip determines whether the first video signal is in the stable state; and
after the first video signal processing chip determines that the first video signal is in the stable state, the first video signal processing chip determines whether both of the first video signal and the second video signal are in the stable state, and
wherein:
after the first video signal processing chip determines that the first video signal is in the stable state, the first video signal processing chip outputs a first preparation signal to the first video signal processing chip;
the second video signal processing chip determines whether the second video signal is in the stable state;
after the second video signal processing chip determines that the second video signal is in the stable state, the second video signal processing chip outputs a second preparation signal to the first video signal processing chip; and
the first video signal processing chip determining whether both of the first video signal and the second video signal are in the stable state comprises: the first video signal processing chip determining whether both of the first video signal and the second video signal are in the stable state according to the first preparation signal and the second preparation signal.

2. The video signal processing system according to claim 1, wherein the synchronization signal is outputted via a general purpose input/output (GPIO) port of the first video signal processing chip to another GPIO port of the first video signal processing chip and a GPIO port of the second video signal processing chip.

3. The video signal processing system according to claim 2, wherein the synchronization signal is an interrupt signal.

4. The video signal processing system according to claim 1, wherein:
the first preparation signal is outputted via a GPIO port of the first video signal processing chip to another GPIO port of the first video signal processing chip; and
the second preparation signal is outputted via a GPIO port of the second video signal processing chip to still another GPIO port of the first video signal processing chip.

5. A video signal processing chip, comprising:
a scaler, receiving a video signal; and
a controller, determining whether both of the video signal and another video signal received by another video signal processing chip are in a stable state, sending a synchronization signal to the video signal processing chip and the another video signal processing chip after determining that both of the video signal and the another video signal received by the another video signal processing chip are in the stable state, and controlling the scaler to output a scaled signal to a display device after the synchronization signal is received,
wherein:
the video signal processing chip determines whether the video signal is in the stable state; and
after the video signal processing chip determines that the video signal is in the stable state, the video signal processing chip determines whether both of the video signal and the another video signal are in the stable state, and
wherein:
after the video signal processing chip determines that the video signal is in the stable state, the video signal processing chip outputs a preparation signal to the video signal processing chip;
another preparation signal is received from the another video signal processing chip, wherein the another preparation signal is outputted after the another video signal processing chip determines that the another video signal is in the stable state; and
the video signal processing chip determining whether both of the video signal and the another video signal are in the stable state comprises: the video signal processing chip determining whether both of the video signal and the another video signal are in the stable state according to the preparation signal and the another preparation signal.

6. The video signal processing chip according to claim 5, wherein the synchronization signal is outputted via a GPIO port of the video signal processing chip to another GPIO port of the video signal processing chip and a GPIO port of the another video signal processing chip.

7. The video signal processing chip according to claim 6, wherein the synchronization signal is an interrupt signal.

8. The video signal processing chip according to claim 5, wherein:
the preparation signal is outputted via a GPIO port of the video signal processing chip to another GPIO port of the video signal processing chip; and
the another preparation signal is outputted via a GPIO port of the another video signal processing chip to still another GPIO port of the video signal processing chip.

9. A video signal processing method, for controlling a video signal processing system, the video signal processing system connected between a display device and a display card, the video signal processing system comprising a video signal processing chip and another video signal processing chip, the video signal processing method comprising:
the video signal processing chip receiving a video signal from the display card;
the video signal processing chip determining whether both of the video signal and another video signal received by the another video signal processing chip from the display card are in a stable state;
after the video signal processing chip determines that both of the video signal and the another video signal are in the stable state, the video signal processing chip sending a synchronization signal to the video signal processing chip and the another video signal processing chip; and
after the video signal processing chip receives the synchronization signal, outputting a processed video signal to a display device according to the video signal,
wherein:
the video signal processing chip determines whether the video signal is in the stable state; and
after the video signal processing chip determines that the video signal is in the stable state, the video signal processing chip determines whether both of the video signal and the another video signal are in the stable state, and
wherein:
after the video signal processing chip determines that the video signal is in the stable state, the video signal processing chip outputs a preparation signal to the video signal processing chip;
another preparation signal is received from the another video signal processing chip, wherein the another preparation signal is outputted after the another video signal processing chip determines that the another video signal is in the stable state; and
the video signal processing chip determining whether both of the video signal and the another video signal are in the stable state comprises: the video signal processing chip determining whether both of the video signal and the another video signal are in the stable state according to the preparation signal and the another preparation signal.

10. The video signal processing method according to claim 9, wherein the synchronization signal is outputted via a GPIO port of the video signal processing chip to another GPIO port of the video signal processing chip and a GPIO port of the another video signal processing chip.

11. The video signal processing method according to claim 9, wherein the synchronization signal is an interrupt signal.

12. The video signal processing method according to claim 9, wherein:
the preparation signal is outputted via a GPIO port of the video signal processing chip to another GPIO port of the video signal processing chip; and the another preparation signal is outputted via a GPIO port of the another video signal processing chip to still another GPIO port of the video signal processing chip.

\* \* \* \* \*